Patented Sept. 27, 1938

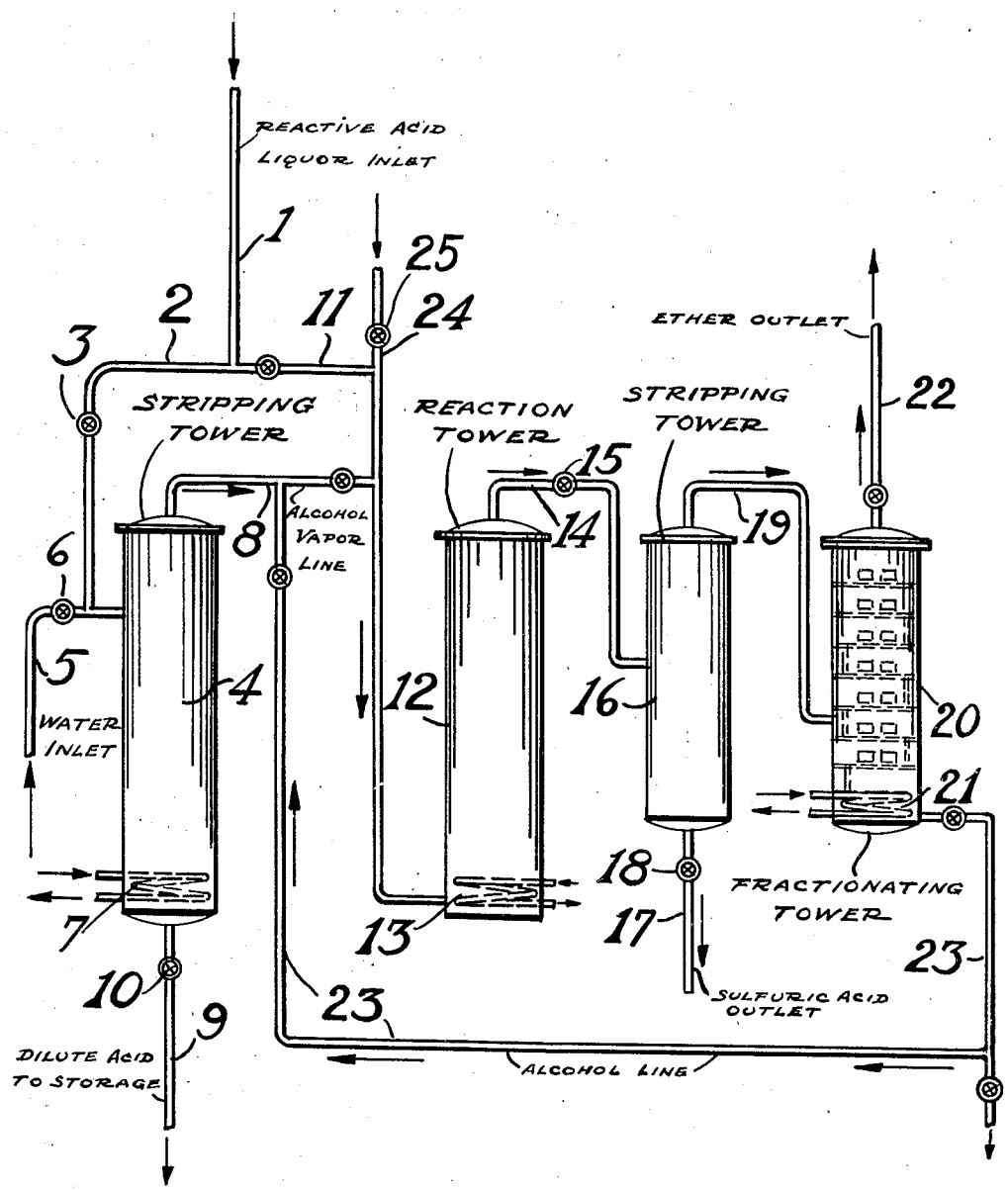

2,131,030

UNITED STATES PATENT OFFICE 2,131,030

ETHERS FROM REACTIVE ACID LIQUOR

Francis M. Archibald, Elizabeth, and Helmuth G. Schneider, Roselle, N. J., assignors to Standard Alcohol Company Application June 6, 1936, Serial No. 83,896

17 Claims. (Cl. 260—151)

This invention relates to an improvement in the manufacture of ethers, and more particularly to the production of ethers from the reactive acid liquors prepared by the absorption of olefins in sulfuric acids.

Ethers are prepared from alcohols or olefins by dissolving the alcohols or olefins in acids and distilling off ethers that are formed. The formation of ethers when prepared from alcohols and acid or dissolved olefins and acid (extract) is an equilibrium reaction. At any given acid strength the conversion of ethers is increased by raising the olefin or alcohol to acid mol ratio. Temperatures from 28° to 100° C. have only very slight effect on the equilibrium.

The conversion to ethers is favored for any given acid strength by having a large excess of alcohol present as can be seen from the following experimental results:

| $\dfrac{\text{Mol ratio of isopropyl alcohol}}{60\% \text{ H}_2\text{SO}_4}$ | Conversion of alcohol to ether |
|---|---|
| | Percent |
| 0.67 | 7 |
| 1.50 | 15 |
| 3.05 | 36 |
| 4.15 | 50 |

It has been found that the equilibrium at any temperature was more rapidly reached from the ether-acid and olefin-acid side than from the alcohol-acid side. The concentration of the acid used has a great effect on the reaction. Where sulfuric acid is used, an acid of 50 to 60% effective strength is preferred. When higher concentrations of sulfuric acid are used, the formation of polymers is greatly increased and with weaker acids, ether formation is very slow, although it is possible by raising the temperature to increase the ether formation rate, since the temperature coefficient of the ether-forming reaction is high. Acids as low as 30% concentration have been used and gave satisfactory results. While sulfuric acid is the preferred catalyst, other materials may be used as well, for example, phosphoric acid, hydrochloric acid, etc., with their concentrations adjusted to form alkyl esters more readily.

When olefins are absorbed in sulfuric acid of 80 to 95% concentration, a reactive acid liquor is obtained. This reactive acid liquor is diluted usually to 20 or 40% to hydrolyze and on distillation alcohols with a small amount of ether are obtained. According to this invention, the reactive acid liquor is not greatly diluted but only partially, i. e., 45 to 65% concentration, and upon heating of this partially diluted reactive acid liquor, a greater proportion of ethers is obtained than by the former method.

The invention will be fully understood from the following description and drawing. The drawing represents a diagrammatic view in sectional elevation of an apparatus adapted to carry out the process of the invention and indicates the flow of materials.

Either pure olefins or mixtures of olefins with saturated hydrocarbons are absorbed in acids of suitable strength (usually 80 to 95%) in accordance with the prior art. The reactive acid liquor so obtained is passed through pipe 1. At the beginning of the operation of this process the reactive acid liquor is divided into two equal parts and one part is passed through pipe 2, provided with valve 3, into a stripping tower 4. Water sufficient to dilute the acid liquor to 25 to 60%, preferably 40%, is added to hydrolyze the reactive acid liquor passed into the stripping tower 4 by means of pipe 5, provided with valve 6. The stripping tower 4 is heated by means of steam coil 7 and the alcohol that has been formed is vaporized and removed through pipe 8.

The dilute acid, after removal of the alcohol, is passed to storage (not shown) through pipe 9, provided with valve 10. The other half of the reactive acid liquor is passed through pipe 11 into a reaction tower 12, where a temperature of about 80° to 130° C., preferably 100° C., and a pressure of 100 to 200 pounds per square inch is maintained.

Into this tower is also passed the alcohol vapors obtained from the stripping tower 4. A mixture of reactive acid liquor and recovered alcohol is maintained in this tower for about four hours, the temperature being controlled by means of steam coil 13.

The products from the reaction tower 12 are then passed through pipe 14, provided with valve 15, into a stripping tower 16, where the sulfuric acid is stripped and removed by means of pipe 17, provided with valve 18.

The separated alcohol and ether are passed through pipe 19 into fractionating tower 20, heated by means of steam coil 21. Either is removed from the outlet 22 and condensed. The alcohol is removed from the bottom of the fractionating tower through pipe 23, and upon mixing with the reactive acid liquor returned to the reaction drum 12. When alcohol is being recovered from the fractionating tower 20, it is not necessary to use the stripper 4 to obtain any alcohol.

All of the reactive acid liquor is passed directly into the reaction tower 12, together with sufficient recovered alcohol from the fractionating tower 20 to dilute the acid to a concentration less than 65% sulfuric acid. When necessary as a fine adjustment, additional water is admitted by pipe 24, provided with valve 25, to maintain the proper concentration. The amount of alcohol that is used to dilute the reactive acid liquor is always regulated so that a constant ratio of alcohol and acid is present.

*Example 1*

830 cc. extract (solution of propylene in 92% $H_2SO_4$) (mol. ratio olefin to acid 1.3/1.0) and 1050 cc. isopropyl alcohol were heated overnight at 100° C. The pressure developed was 130 lbs.

Total alcohol in charge 1551 cc.

Recovered—668 cc. isopropyl ether, 782 cc. isopropyl alcohol.

Conversion of alcohol to ether based on alcohol reacted=92.6%.

Conversion of alcohol to ether based on alcohol charged=46.5%.

*Example 2*

Charged—1420 cc. isopropyl alcohol, 340 cc. 95% $H_2SO_4$.

Heated overnight at 98–100° C. Pressure developed—125 lbs. per square inch.

Recovered—477 cc. ether, 865 cc. alcohol.

Conversion of alcohol to ether based on alcohol reacted=93.3%.

Conversion of alcohol to ether based on alcohol charged=36.4%.

*Example 3*

Charge—3380 cc. isopropyl alcohol, 400 cc. 95% $H_2SO_4$.

This yielded a 30% effective acid with the mol. ratio of alcohol to acid of 11.4; heated to 96° C. and developed a pressure of 250 pounds per square inch.

Recovered—800 cc. alcohol, 2100 cc. ether.

Gas formed 2.7 cubic feet.

Conversion of alcohol to ether based on alcohol reacted=88.5%.

Conversion of alcohol to ether based on alcohol charged=67.5%.

The "effective" strength of the sulfuric acid is calculated on a basis of total water, including both free water and water chemically combined in alcohol.

Alternately, if mixed ethers are to be produced, another alcohol than that present in the reactive acid liquor is added. It is not necessary to dilute the reactive acid liquor with the same alcohol which is present in the reactive acid liquor. The distillate therefrom obtained is fractionated in order to segregate the desired alcohol which is to be used to dilute the reactive acid liquor.

The concentration of sulfuric acid best adapted to form ethers is regulated by the temperatures and pressures used. Sulfuric acids with concentrates of 84% may be used as also concentration as low as 1%, but the temperatures and pressures must be varied accordingly. The pressure generally used is that which develops in the reaction. It is not necessary that alcohol alone be used for dilution, though it is preferred to do so. Water or water and alcohol may be used.

The foregoing description is merely illustrative and various changes and alternative arrangements may be made within the scope of the appended claims, in which it is our intention to claim all inherent novelty as broadly as the prior art permits.

We claim:

1. A process for manufacturing ethers, which comprises reacting olefins with sulfuric acid to form acid liquors, diluting the acid liquors with alcohols to reduce the effective strength of the sulfuric acid under 84%, holding the diluted acid liquors at a reacting temperature until substantially all the acid liquor is reacted, separating the products formed from the sulfuric acid and fractionating the products to obtain ethers and alcohols.

2. A process of manufacturing ethers according to claim 1, in which the diluted acid liquors are hydrolyzed at temperatures above 50° C. and under a pressure such as is developed by the reaction.

3. A process for manufacturing ethers according to claim 1, in which the separated alcohols are recycled to dilute the acid liquors.

4. A process for manufacturing ethers which comprises diluting acid liquors with alcohols to obtain an acid of 25 to 65% concentration, holding the said dilute acid at a temperature of 80° to 130° C. and under a pressure such as is developed by the reaction, separating the sulfuric acid from the alcohol and ethers formed and fractionating the alcohols and ethers.

5. A process for manufacturing ethers which comprises diluting reactive acid liquors with alcohol to less than 84% acid concentration, holding the said diluted reactive acid liquor at a temperature above 50° C. under the pressure such as is developed until substantial equilibrium is reached, separating the sulfuric acid from the alcohol and ethers formed and fractionating the alcohols and ethers.

6. A process for manufacturing ethers according to claim 5 in which the reactive acid liquor was diluted with an alcohol and water.

7. A process for manufacturing ethers according to claim 5, in which the fractionated alcohol is recirculated through the process.

8. A process for manufacturing mixed ethers which comprises absorbing an olefine with acids to form acid liquors diluting the acid liquors with alcohols other than those which can be produced from the said acid liquors, maintaining the diluted acid liquors at elevated temperatures until ether formation is substantially complete, separating the products from the acids and fractionating the products to obtain mixed ethers and alcohols.

9. A process for manufacturing ethers which comprises absorbing an olefine in acid to form reactive acid liquor, then diluting the acid liquor with an alcohol, maintaining the diluted acid liquor at elevated temperatures until the ether formation is substantially complete, separating the products from the acids and fractionating the products to obtain mixed ethers and alcohols.

10. Process of producing ethers from acid liquors comprising absorbing an olefine in concentrated acid, then diluting the acid liquor with alcohol in an amount to secure a mol ratio of alcohol to acid above 2, maintaining the acid at ether forming strength and temperature until the reaction is substantially complete.

11. Process in accordance with claim 10, carried out at elevated temperatures under the pressure as developed by the reaction.

12. Process of producing ethers from acid liquors secured by absorbing a secondary base olefine in concentrated sulphuric acid comprising adding to said acid liquors an alcohol in amount to reduce the effective acid strength to between 30% and 65% and maintaining the diluted acid liquors at a reacting temperature until ether formation is substantially complete.

13. Process in accordance with claim 12, carried out at a temperature between 80 and 130° C. under a pressure as developed by the reaction.

14. Process of producing ethers comprising absorbing secondary base olefines in an acid of 80% to 95% concentration to form an acid liquor, diluting said acid liquor with an added alcohol, maintaining the acid at a reacting temperature and under the pressure as developed by the reaction until the ether formation is substantially complete.

15. Process of producing ethers from acid liquors comprising absorbing olefines in concentrated sulphuric acid to form acid liquor, diluting said acid liquor with alcohol to form a mol ratio of alcohol to acid below 4.15 and to secure an effective acid strength of about 40% and maintaining the diluted acid at elevated temperatures from 80 to 130° C. under a pressure as developed by the reaction.

16. Process of producing ethers from acid liquor secured by absorbing olefines in concentrated sulphuric acid above 80% strength comprising diluting said acid liquor with alcohol to secure an effective acid strength of from 45 to 65%, maintaining the diluted acid liquor at elevated temperatures from 80 to 130° C. and under a pressure developed by the reaction.

17. A process for the utilization of unsaturated hydrocarbons in the manufacture of ethers, which comprises absorbing the unsaturated hydrocarbons in a concentrated mineral acid to form reactive acid liquor, reducing the effective concentration of the acid to between 30% and 65% by the addition of alcohol, reacting the mixture of reactive acid liquor and alcohol at an elevated temperature and under the pressure developed by the reaction until substantial equilibrium is reached, removing the alcohol and ether from the acid and fractionating the alcohol and ether.

FRANCIS M. ARCHIBALD.
HELMUTH G. SCHNEIDER.